United States Patent [19]
Burns

[11] 3,878,727
[45] Apr. 22, 1975

[54] FLUID NETWORK FOR AND METHOD OF CONTROLLING ZERO-FLOW THROUGH A MEASURING CELL

[75] Inventor: Richard H. Burns, Webster, N.Y.

[73] Assignee: Bausch & Lomb Incorporated, Rochester, N.Y.

[22] Filed: Oct. 19, 1973

[21] Appl. No.: 408,211

[52] U.S. Cl............................. 73/422 TC; 356/246
[51] Int. Cl. ............................................. G01n 1/20
[58] Field of Search........ 73/422 R, 422 TC, 432 R; 356/246

[56] References Cited
UNITED STATES PATENTS

| | | | |
|---|---|---|---|
| 1,448,709 | 3/1923 | Schulze....................... | 73/422 TC X |
| 2,484,279 | 10/1949 | Folz.............................. | 73/422 R X |
| 2,784,594 | 3/1957 | Struck........................... | 73/422 TC |
| 3,031,890 | 5/1962 | Struck........................... | 73/422 TC |

Primary Examiner—Richard C. Queisser
Assistant Examiner—Frederick Shoon
Attorney, Agent, or Firm—Frank C. Parker; Bernard D. Bogdon

[57] ABSTRACT

A system for controlling fluid flow through a measuring cell, includes a closed fluid network having two in-line fluid inlet valves and one fluid outlet valve, with a first fluid bypass path originating at a fluid connection between the inlet valves and terminating at the output end of the measuring cell. A second fluid bypass path originates at the upstream side of the first inlet valve and terminates at the downstream side of the output valve. The output valve is vented during the measurement cycle into the atmosphere apposite the measuring cell.

4 Claims, 1 Drawing Figure

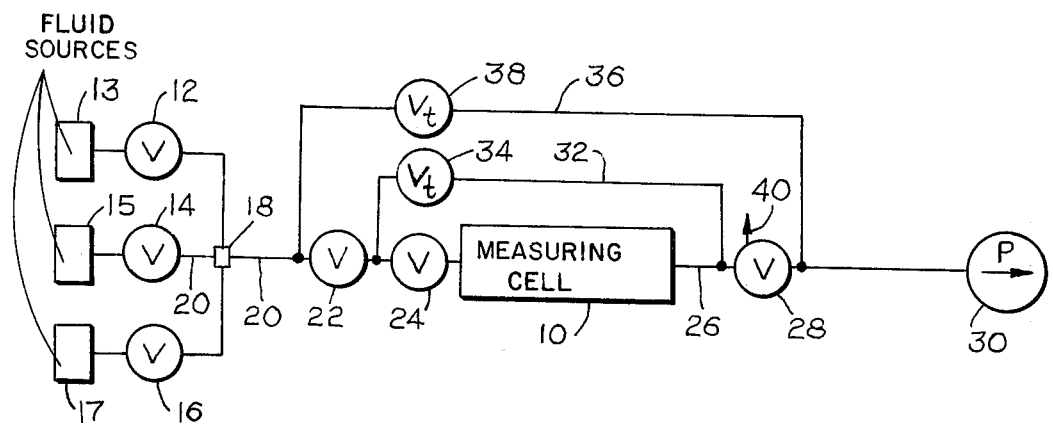

FLUID NETWORK FOR AND METHOD OF CONTROLLING ZERO-FLOW THROUGH A MEASURING CELL

FIELD OF THE INVENTION

The present invention relates to apparatus for and method of controlling and stabilizing fluid flow through a measuring cell, and in particular to apparatus for and method of providing zero fluid flow through a measuring cell particularly, where the fluid lines are elastic and the fluid is moved by a displacement-type pump.

SUMMARY OF THE INVENTION

Particularly for use in electro-optical analysis of particles, colloidal suspensions or other features in a liquid fluid, there is provided a fluid network including a bridge across a measuring cell for use during analysis of the fluid and the suspended particles.

BRIEF DESCRIPTION OF THE DRAWING

The FIGURE is a schematic illustration of a fluid network embodiment according to the principles of the present invention.

DETAILED DESCRIPTION OF THE PREFERRED EMBODIMENT

In the FIGURE, a measuring cell 10, for analysis of fluid suspended particles is depicted. The cell 10, for example, may be of the kind illustrated in concurrently filed and copending patent application entitled "APPARATUS FOR AND METHOD OF AUTOMATICALLY DETERMINING VELOCITY RELATED PARAMETERS OF FLUID BORNE COLLOIDAL SUSPENSIONS", Ser. No. 408,202 for applicant Roger R. Morton and U.S. Pat. No. 3,723,712 entitled "METHOD FOR AGGLOMERATION MEASURING AND CONTROL" issued in the names of applicants Thomas R. Komline, Sr. and Walter R. Wills and assigned to Komline-Sanderson Engineering Corporation, Peapack, New Jersey. It will be appreciated that tracking the fluid suspended colloids while in suspension provides the best analytical results. The most accurate and dependable results are obtained when little or no extraneous influences, such as outside fluid pressure influences, tend to migrate the particles in erratic patterns. Practical problems such as valve leakage promote outside forces or background flows of the kind which generally fluctuate so that there may be a net fluid flow through the cell which is difficult to determine and, additionally, may be sporadic and usually provides an unknown in the analysis results. These conditions lead to unreliable data. In addition, in the present state of the art, efforts to provide fluid line material most suited to the fluid under analysis and efforts to conserve space and to minimize costs, leads to the use of elastic type materials such as nylon or vinyl. These types of materials relax after being under pressure and tend to add to the force problem by creating pressure heads across valves and other units such as the measuring cell. The dynamics of such materials like vinyl, gum rubber or nylon, which is preferred, are compensated for by the herein disclosed invention. Vibration is also a factor which might disrupt the analytical results, and to reduce or eliminate pressure heads it is preferred that the whole system be in a substantially horizontal plane. In addition, in a waste system the waste materials can clogg or obstruct the valves and thereby preclude full closure of one or more valves and cause fluid to continue to flow at undesirable times and influence the analytical results.

In the illustrated embodiment three valves 12, 14 and 16 are provided to introduce sample fluid for analysis, standard fluid for calibration or flushing fluid to clear and clean, respectively, into the measuring cell 10. It will be appreciated that it is desirable that none of the valves 12, 14 or 16 leak when closed. Studies on colloidal suspensions produce the best analytical results when particles are static and are not apt to be influenced to move about because of uncontrollable outside force factors.

As hereinbefore mentioned, the valves 12, 14 and 16 are each, respectively, connected to fluid sources 13, 15 and 17 of the respective type of liquids and from the FIGURE it is seen that all are in fluid communication with a common fluid junction 18. The junction 18 is connected in-line through a fluid conduit 20 with a first input valve 22 and a second input valve 24 and thereafter preferably connected directly and rigidly to the inlet side of the measuring cell 10, to preclude vibration between the component parts. Fluid is exited from the measuring cell 10 at its outlet end through fluid conduit 26 in-line with outlet valve 28 to a waste reservoir and pump system 30. A pump best suited for the present application is one producing peristaltic pumping movement. It will be appreciated, however, that any type of suction pump capable of moving the fluid without producing disruptive effects during the analysis of the fluid, is satisfactory. The fluid conduit lines of the present analytical system for waste analysis are preferably of nylon material. Any conduit material with a suitable damping effect can be used, providing it is compatible with the fluid being analyzed. The conduit material is preferably electrically nonconductive and essentially rigid and non-corrosive.

According to the principles of the present invention, a first bypass fluid conduit 32 is provided from the inlet side to the outlet side of the measuring cell. The first bypass conduit 32 is connected between the valves 22 and 24 and terminates in fluid communication with the conduit 26 between the measuring cell 10 and outlet valve 28. Disposed in-line with the fluid bypass conduit 32 is a throttling orifice or valve 34 for providing a control for passing fluid at a relatively slow rate, in a path around the cell 10, and to primarily provide, in combination with the conduit 32, a closed path to equalize pressure on opposite sides of the cell 10. Disposed in fluid communication with the fluid junction 18 and the waste reservoir and pump 30 is a second bypass fluid conduit 36. Disposed in-line with the bypass fluid conduit 36 is a throttling orifice or valve 38 having similar throttling operation and function as the throttle valve 34 to provide for the majority of the fluid being introduced through any of the valves 12, 14 or 16 to pass to the measuring cell 10. Of primary importance, however, is the condition that, if any of valves 12, 14 and/or 16 is kept open or is obstructed from closing during analysis, any fluid flowing, due to a pressure head, is diverted through the bypass conduit 36 to the operating peristaltic type pump, to preclude forced leakage at any other component of the system. If the input lines are at greater than atmospheric pressure, and especially if no pump is used on the exhaust side of the system, all valves must be closed during the measuring cycle.

During the measurement cycle, when information is being optically collected from the measuring cell 10, the valve 28 is vented to the atmosphere on the measuring cell side of the valve, as diagramatically illustrated by arrow 40. As hereinbefore presented, bypass fluid conduit 32 provides a path to the inlet side of valve 24 which controls fluid flow into the cell 10. At times of measurement-taking both sides of valve 24 are at atmospheric pressure thereby equalizing pressure across the fittings at cell 10 and preventing leakage of fluid out of or air into it the cell or leakage through valve 24, even if it is not fully closed. Valve 22 is provided to prevent fluid flow through first bypass conduit 32 to valve 28 and out its atmospheric vent 40. As hereinbefore mentioned, second bypass fluid conduit 36 provides a continuous fluid path to the peristaltic type pump in order to compensate for pressure build up on valves 22 and 24 due to any leakage through valves 12, 14 or 16. Conduit collapse caused by pumping action under conditions where no fluid is flowing, may be prevented by leaving valve 12, 14 or 16 open during measurement and passing fluid to the pump around the cell 10 through bypass 36, giving a substantially zero head across valve 22, so it will not leak significantly if it does not fully close.

During the operation of the total system it may be desirable to keep the pump 30 continuously running to preclude erratic fluid flow at the beginning of the pumping action or, where a pressure head exists at the fluid sources, to preclude the pump 30 from stalling out at start-up and not being able to come up to full operation force. If the pump 30 is to be kept running, it is best accomplished by leaving fluid continuously passing through an open source valve through the second bypass fluid conduit 36 or otherwise by providing a shunt fluid path around the pump to act as a closed loop fluid path for satisfactory operation of the pump during the analysis period.

The following is claimed:

1. A closed fluid network in an environment having a given base pressure for providing, during a period of analysis, zero fluid flow within a flow-through measuring cell, comprising:
    a flow-through fluid measuring cell having an inlet end for incoming fluid and an outlet end for outgoing fluid including means for the fluid within the cell to be optically viewed during analysis;
    a first inlet valve in fluid communication with the cell at the inlet end;
    an outlet valve in fluid communication with the cell at the outlet end;
    venting means at the cell side of the outlet valve for venting the outlet end of the cell to the given base pressure;
    a second inlet valve having one side connected in-line with one side of the first inlet valve for receiving incoming fluid and controlling the passage of the incoming fluid to the measuring cell through the first inlet valve; and
    first fluid bypass means connected between the outlet end of the measuring cell and the in-line connection between the first and second inlet valves for providing a closed fluid path therebetween to provide base pressure at both ends of the measuring cell during a period of analysis.

2. The closed fluid network as defined in claim 1, further including:
    displacement-type pumping means in fluid communication with that side of the outlet valve apposite the venting means at the second end of the measuring cell for pumping fluid through the network, including the flow-through measuring cell and the first fluid bypass means; and
    second fluid bypass means connected between that side of the first inlet valve for receiving incoming fluid and that side of the outlet valve apposite the venting means for providing, during said period of analysis, a fluid path alternate to the fluid path including the measuring cell and first fluid bypass means for incoming fluid flowing under pressure.

3. The closed fluid network as defined in claim 2, further including individual throttling valves in each of the first and second fluid bypass means controlling the fluid flow rate through each of the first and second fluid bypass means at a significantly lesser fluid flow rate than through the flow-through measuring cell.

4. A closed fluid network for providing zero fluid flow in a flow-through measuring cell, comprising:
    a source of fluid;
    a control valve in communication with the source of fluid to control the flow of the fluid from the source;
    a first and a second inlet valve connected together in communication with the fluid in the source through the control valve;
    a flow-through fluid measuring cell connected to the second inlet valve for receiving fluid passing serially through the control valve, the first inlet valve and the second inlet valve;
    an outlet valve in communication with the cell, with that side of said outlet valve next to the cell being vented to the atmosphere;
    first bleeder bypass means in communication with both the first and second inlet valves on a first end and the outlet valve next to the cell on a second end for providing a fluid path to equalize the fluid pressure at the input and output ends of the flow-through cell; and
    second bleeder bypass means in communication with both the control valve and the first inlet valve on one end and the outlet valve opposite the cell on a second end for providing a fluid path for stabilizing fluid flow in a fluid path bypassing the flow-through cell when zero fluid flow is being maintained within the flow-through cell.

* * * * *